(12) United States Patent
Nam et al.

(10) Patent No.: US 8,264,626 B2
(45) Date of Patent: Sep. 11, 2012

(54) STEREOSCOPIC IMAGE DISPLAY DEVICE

(75) Inventors: Hui Nam, Yongin (KR); Beom-Shik Kim, Yongin (KR); Chan-Young Park, Yongin (KR); Ja-Seung Ku, Yongin (KR); Hyoung-Wook Jang, Yongin (KR)

(73) Assignee: Samsung Display Co., Ltd., Yongin, Gyunggi-Do (KR)

( * ) Notice: Subject to any disclaimer, the term of this patent is extended or adjusted under 35 U.S.C. 154(b) by 257 days.

(21) Appl. No.: 12/659,614

(22) Filed: Mar. 15, 2010

(65) Prior Publication Data
US 2011/0043713 A1 Feb. 24, 2011

(30) Foreign Application Priority Data
Aug. 21, 2009 (KR) .................. 10-2009-0077666

(51) Int. Cl.
*G02F 1/1335* (2006.01)

(52) U.S. Cl. .................................... 349/15; 349/117
(58) Field of Classification Search .............. None
See application file for complete search history.

(56) References Cited

U.S. PATENT DOCUMENTS

| | | | | |
|---|---|---|---|---|
| 7,557,871 | B2 * | 7/2009 | Matsumoto et al. | 349/15 |
| 7,609,330 | B2 * | 10/2009 | Kim | 349/15 |
| 7,612,833 | B2 * | 11/2009 | Kim | 349/15 |
| 7,646,438 | B2 * | 1/2010 | Park et al. | 349/15 |
| 7,787,064 | B2 * | 8/2010 | Kwon et al. | 349/15 |
| 8,059,063 | B2 * | 11/2011 | Nam et al. | 345/6 |
| 2006/0146208 | A1 * | 7/2006 | Kim | 349/15 |
| 2009/0251625 | A1 * | 10/2009 | Kwon et al. | 349/15 |
| 2010/0091204 | A1 * | 4/2010 | Chen et al. | 349/15 |
| 2010/0091205 | A1 * | 4/2010 | Wu et al. | 349/15 |

FOREIGN PATENT DOCUMENTS

| | | |
|---|---|---|
| JP | 2004-264761 A | 9/2004 |
| KR | 10-0647517 B1 | 11/2006 |
| KR | 10 2006-0135450 A | 12/2006 |
| KR | 10 2008-00249 A | 3/2008 |

* cited by examiner

*Primary Examiner* — Tina Wong
(74) *Attorney, Agent, or Firm* — Lee & Morse, P.C.

(57) ABSTRACT

A stereoscopic image display device includes a display panel configured to display an image, a barrier placed over the display panel and configured to include a plurality of liquid crystal cells each of which is selectively driven to become a transparent cell or an opaque cell, a polarizing plate placed between the display panel and the barrier, and a phase retarder placed between the internal polarizing plate and the display panel.

15 Claims, 5 Drawing Sheets

STEREOSCOPIC IMAGE DISPLAY DEVICE

BACKGROUND

1. Field

Example embodiments relate to a stereoscopic image display device. More particularly example embodiments relate to a stereoscopic image display device implementing a stereoscopic image.

2. Description of the Related Art

In general, factors that allow a person to perceive stereoscopic effects may include physiological factors and empirical factors. In the three-dimensional image display technology, a person may perceive the stereoscopic effects of an object, e.g., at close range, using binocular parallax. Methods using such binocular parallax may include a stereoscopic method of wearing a pair of spectacles and an autostereoscopic method, i.e., without wearing a pair of spectacles.

In a conventional autostereoscopic method, a stereoscopic effect is realized by separating a left-eye image and a right-eye image using a barrier disposed on a display panel. An opaque region and a transparent region are repeatedly arranged in the barrier, while a pixel corresponding to the right eye and a pixel corresponding to the left eye are formed in the display panel. As a viewer sees an image displayed on the display panel through the transparent region of the barrier, the viewer may perceive a stereoscopic image, i.e., a 3D image, because the left and right eyes of the viewer see different regions of the display panel even though the viewer sees the image through the same transparent region.

The stereoscopic image display device may include a liquid crystal layer in the barrier. However, light may be reflected from the display panel and may be transmitted through the liquid crystal layer outside the display device to be seen by the viewer. As such, the reflected light may decrease image quality of a stereoscopic image.

The above information disclosed in this Background section is only for enhancement of understanding of the background of the invention and therefore it may contain information that does not form the prior art that is already known in this country to a person of ordinary skill in the art.

SUMMARY

Embodiments are therefore directed to a stereoscopic image display device, which substantially overcomes one or more of the problems due to the limitations and disadvantages of the related art.

It is therefore a feature of an embodiment to provide a stereoscopic image display device having a polarizing plate and a phase retarder configured to suppress light reflected from a display panel in order to improve image quality.

At least one of the above and other features and advantages may be realized by providing a stereoscopic image display device, including a display panel configured to display an image, a barrier placed over the display panel and configured to include a plurality of liquid crystal cells each of which is selectively driven to become a transparent cell or an opaque cell, an internal polarizing polarizing plate placed between the display panel and the barrier, and a phase retarder placed between the internal polarizing polarizing plate and the display panel.

The internal polarizing plate may be attached to the barrier, and the phase retarder may be attached to the internal polarizing plate.

An air layer may be further formed between the phase retarder and the display panel.

Light that has been linearly polarized through the internal polarizing plate may be circularly polarized through the phase retarder.

The phase retarder may be a ¼ wavelength plate, and a crossing angle between an optical axis of the phase retarder and a polarization axis of the internal polarizing plate may be 45°.

The stereoscopic image display device may further include an external polarizing plate opposite to the internal polarizing plate with the barrier interposed therebetween.

The internal polarizing plate and the phase retarder may be stacked on the barrier. The phase retarder may be spaced a predetermined distance from the display panel. The internal polarizing plate may directly contact the phase retarder and the barrier.

The display panel may include a first display substrate, a second display substrate opposite to the first display substrate, and an organic light emitting element placed between the first display substrate and the second display substrate and configured to display the image.

The barrier may include a first barrier substrate, a second barrier substrate opposite to the first barrier substrate, and a liquid crystal layer placed between the first barrier substrate and the second barrier substrate and configured to form the plurality of liquid crystal cells.

The stereoscopic image display device may further include a barrier driver driving the barrier, a display panel driver driving the display panel, and a controller controlling the barrier driver and the display panel driver.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
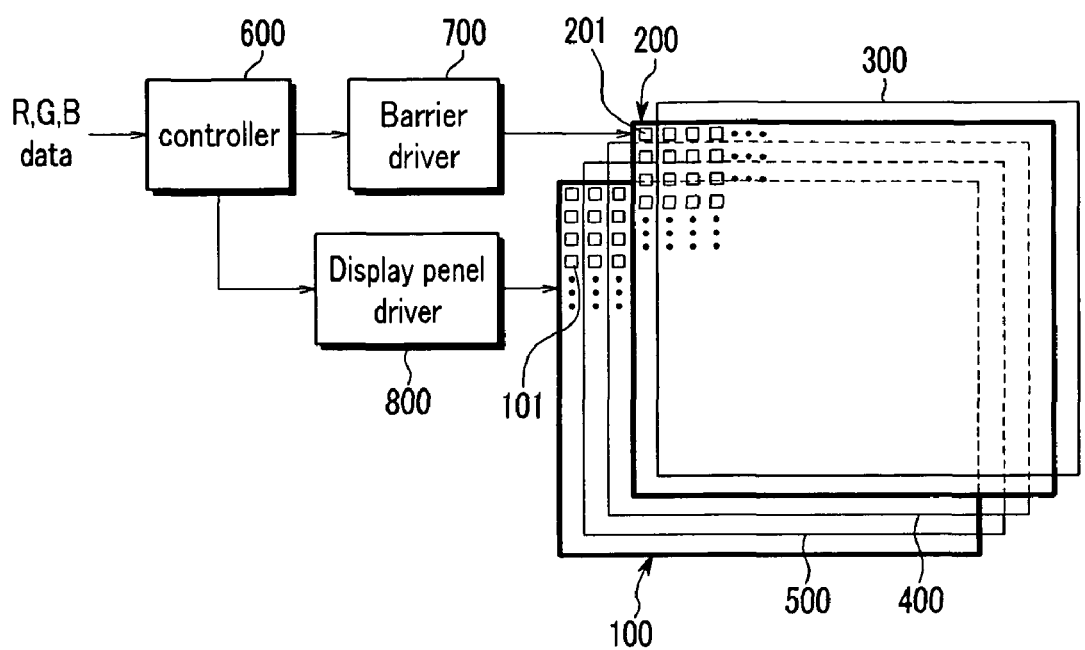
FIG. 1 illustrates a schematic diagram of a stereoscopic image display device according to an exemplary embodiment.

Korean Patent Application No. 10-2009-0077666, filed on Aug. 21, 2009, in the Korean Intellectual Property Office, and entitled: "Stereoscopic Image Display Device," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, an exemplary embodiment is described with reference to FIGS. 1 to 3. FIG. 1 illustrates a schematic diagram of a stereoscopic image display device according to the exemplary embodiment, and FIG. 2 illustrates a cross-sectional view of a stereoscopic image display device according to the exemplary embodiment.

Figure 2:
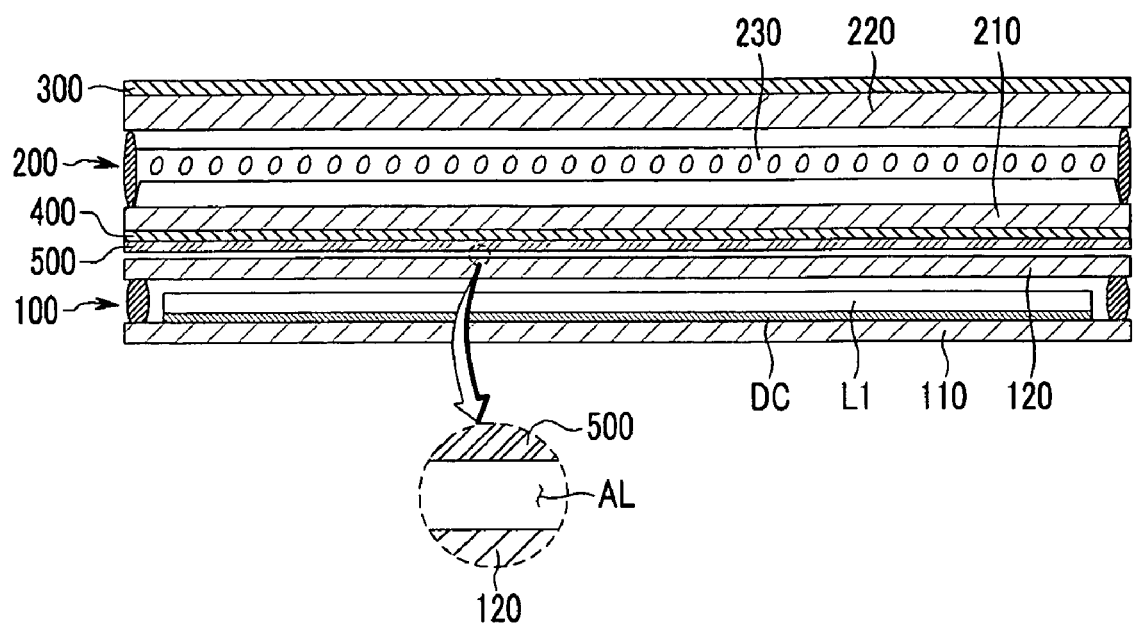
FIG. 2 illustrates a cross-sectional view of a stereoscopic image display device according to an exemplary embodiment.

As illustrates in FIGS. 1 and 2, the stereoscopic image display device according to the exemplary embodiment may include a display panel 100, a barrier 200, an external polarizing plate 300, an internal polarizing plate 400, a phase retarder 500, a controller 600, a barrier driver 700, and a display panel driver 800.

The display panel 100 may include a first display substrate 110, a second display substrate 120, a driving circuit unit DC, and an organic light emitting element L1. The first display substrate 110 and the second display substrate 120 may be spaced apart from each other with the driving circuit unit DC and the organic light emitting element L1 interposed therebetween, and may be opposite to each other. An exemplary configuration of the driving circuit unit DC is illustrated in FIG. 3.

Figure 3:
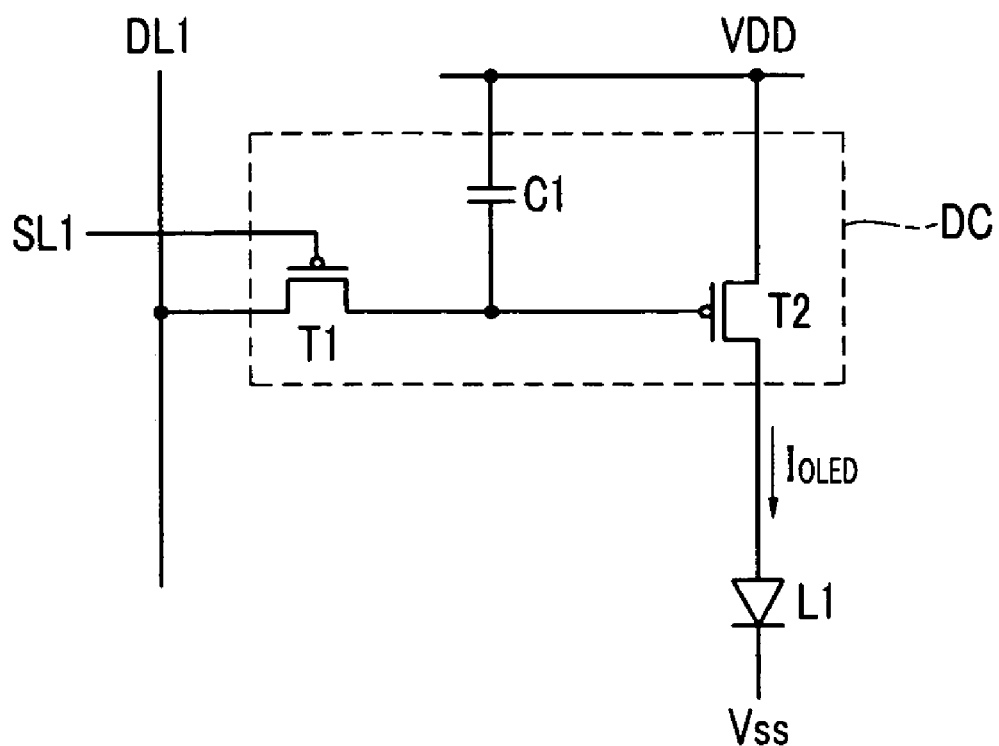
FIG. 3 illustrates a layout view of circuits of a driving circuit unit and an organic light emitting element of the display panel shown in FIG. 2.

FIG. 3 illustrates a layout view of the circuits of the driving circuit unit DC and the organic light emitting element L1 of the display panel 100. In more detail, as illustrated in FIG. 3, the driving circuit unit DC may include two or more thin film transistors T1 and T2 and at least one storage capacitor C1. For example, the transistors T1 and T2 may be a switching transistor T1 and a driving transistor T2.

The switching transistor T1 is connected to a scan line SL1 and a data line DL1, and is configured to transmit a data voltage received from the data line DL1 to the driving transistor T2 in response to a switching voltage input to the scan line SL1. The storage capacitor C1 is connected to the switching transistor T1 and a power line VDD, and is configured to store a voltage corresponding to a difference between a voltage received from the switching transistor T1 and a voltage supplied to the power line VDD.

The driving transistor T2 is connected to the power line VDD and the storage capacitor C1, and is configured to supply an output current $I_{OLED}$ that is proportional to the square of a difference between a threshold voltage and a voltage stored in the storage capacitor C1 to the organic light emitting element L1. The organic light emitting element L1 emits light according to the output current $I_{OLED}$. The driving transistor T2 includes a source electrode, a drain electrode, and a gate electrode.

The organic light emitting element L1 may be an organic light emitting diode (OLED). For example, the organic light emitting element L1 may include electrodes opposite to each other, and an organic emission layer between the electrodes. One of the opposite electrodes may be the anode, and the other of the opposite electrodes may be the cathode. The anode of the organic light emitting element L1 is connected to the drain electrode of the driving transistor T2. Further, one or more of the anodes and the cathodes of the organic light emitting element L1 may be a semi-transparent or reflective type, and may reflect light. It is noted that the driving circuit unit DC and the organic light emitting element L1 are not limited to the above-described configuration and may be modified into a variety of configurations.

Referring to FIGS. 1 and 2, the display panel 100 of the stereoscopic image display device according to the exemplary embodiment may be configured to display an image in such a manner that the organic light emitting element L1 emits light toward the barrier 200. In other words, the display panel 100 may be a front light emitting type, so light from the organic light emitting element L1 may be emitted through the second display substrate 120 of the display panel 100 toward the barrier 200.

The display panel 100 of the stereoscopic image display device according to the exemplary embodiment may further include a plurality of display cells 101 (FIG. 1), so that each display cell 101 may be formed at an intersection of the scan line SL1 and the data line DL1. The plurality of display cells 101 may be adjusted to a structure of liquid crystal cells 201 (FIG. 1) of the barrier 200 that will be described later. For example, assuming that an overall structure of the liquid crystal cells 201 of the barrier 200 has a striped pattern, the display cells 101 of the display panel 100 may display different images that can be seen by the left and right eyes of a viewer while operating in conjunction with the liquid crystal cells 201 of the striped pattern. Consequently, the viewer can perceive a stereoscopic image.

As illustrated in FIGS. 1 and 2, the barrier 200 may be opposite to the display panel 100, and may be placed over the display panel 100. For example, the barrier 200 may be on the display panel 100, and may overlap, e.g., completely overlap, the display panel 100.

The barrier 200 may include a first barrier substrate 210, a second barrier substrate 220, and a liquid crystal layer 230 disposed between the first barrier substrate 210 and the second barrier substrate 220. The liquid crystal layer 230 may include the plurality of liquid crystal cells 201.

The barrier 200 may be an active matrix type including a storage capacitor and a thin film transistor ("TFT"), so the liquid crystal cells 201 may be formed in either the first barrier substrate 210 or the second barrier substrate 220, or a passive matrix type, so the liquid crystal cells 201 may be formed at respective regions where column electrodes and row electrode intersect. Therefore, the barrier 200 may be driven according to an active or passive driving method of a liquid crystal display (LCD) in accordance with its structure. The type of barrier 200 may be changed by the controller 600. For example, the liquid crystal cells 201 of the barrier 200 may selectively become opaque cells or transparent cells in response to a driving signal based on the type of the barrier 200, i.e., active or passive, that is selected by the controller 600.

As further illustrated in FIGS. 1 and 2, the external polarizing plate 300 may be attached to a surface of the barrier 200. For example, the external polarizing plate 300 may be on, e.g., directly on, the second barrier substrate 220 of the barrier 200.

The external polarizing plate 300 may have a first polarization axis, and may linearly polarize light in the direction of the first polarization axis. In more detail, the external polarizing plate 300 may transmit light that is conformal to the first polarization axis, and may absorb light that is not conformal to the first polarization axis. If light passes through the external polarizing plate 300, it is linearly polarized in the direction of the first polarization axis. The first polarization axis of the external polarizing plate 300 may have a predetermined crossing angle with respect to a polarization axis of the internal polarizing plate 400.

The internal polarizing plate 400 may be positioned between the barrier 200 and the display panel 100. The internal polarizing plate 400 may be on, e.g., directly on, the barrier 200. For example, the internal polarizing plate 400 may be on, e.g., directly on, the first barrier substrate 210 of the barrier 200, and may overlap, e.g., completely overlap, the barrier 200. The internal polarizing plate 400 may have a second polarization axis, and may linearly polarize light in the direction of the second polarization axis. In more detail, the internal polarizing plate 400 may transmit light that is conformal to the second polarization axis, and may absorb light that is not conformal to the second polarization axis. If light passes through the internal polarizing plate 400, the light is linearly polarized in the direction of the second polarization axis.

The phase retarder 500 may be placed between the internal polarizing plate 400 and the display panel 100. The phase retarder 500 may be on, e.g., directly on, the internal polarizing plate 400. For example, the phase retarder 500 may overlap, e.g., completely overlap, the internal polarizing plate 400. The phase retarder 500 may be a ¼ wavelength plate, and may have an optical axis at 45° with respect to the second polarization axis of the internal polarizing plate 400. That is, a crossing angle between the optical axis of the phase retarder 500 and the polarization axis of the internal polarizing plate 400 is 45°. Accordingly, light that is linearly polarized through the internal polarizing plate 400 is circularly polarized while passing through the phase retarder 500. In other words, as a crossing angle between the optical axis of the phase retarder 500 and the polarization axis of the internal polarizing plate 400 approaches 45°, light that is linearly polarized through the internal polarizing plate 400 will approach circular-polarization when passing through the phase retarder 500.

As further illustrated in FIG. 2, the phase retarder 500 may be attached to the internal polarizing plate 400 at a predetermined distance from the display panel 100. In other words, an air layer AL may be formed between the phase retarder 500 and the display panel 100.

The structure of the internal polarizing plate 400 and the phase retarder 500 between the barrier 200 and the display panel 100 according to example embodiments may prevent or substantially minimize light reflection from the display panel 100. In particular, light reflected from the display panel 100 may not be seen outside the stereoscopic image display device because the structure of the internal polarizing plate 400 and the phase retarder 500 may absorb such reflected light, as will be discussed in more detail below with reference to FIG. 5.

Referring back to FIG. 1, the controller 600 of the stereoscopic image display device may receive video signals, e.g., R, G, and B data, a horizontal synchronization signal, a vertical synchronization signal, etc., may generate a barrier control signal and a display panel control signal, and may transfer the signals to the barrier driver 700 and the display panel driver 800, respectively. Further, the controller 600 may determine display patterns of the display panel 100 and the barrier 200 based on the received video signals (R, G, B data) or according to a user's choice, and may transfer the determined display patterns to the barrier driver 700 and the display panel driver 800, respectively. In more detail, the controller 600 may determine whether the received video signals (R, G, B data) are 2D signals or 3D signals, or 2-point-in-time 3D video signals or multi-point-in-time 3D video signals, and may transfer a control signal to each of the display panel driver 800 and the barrier driver 700, such that the display panel 100 and the barrier 200 may be driven according to the received video signals.

The barrier driver 700 may receive the control signals from the controller 600, and may drive the barrier 200 in response to the received control signals. In more detail, the barrier driver 700 may drive the barrier 200, such that each of the plurality of liquid crystal cells 201 of the barrier 200 may selectively become an opaque cell or a transparent cell to define a predetermined pattern in the barrier 200, e.g., striped pattern, a speckled pattern, a stair pattern, a multi-point-in-time pattern, etc., based on a display pattern of the barrier 200 determined by the controller 600.

For example, the barrier driver 700 may include memory, a column driver, and a row driver. The memory may store driving signals corresponding to a display pattern, such that the barrier 200 may be driven according to the display pattern in response to the control signals received from the controller 600, may determine the display pattern in response to the control signals received from the controller 600, and may output the driving signals corresponding to the determined display pattern to the column driver and the row driver, respectively. The column driver and the row driver may drive the barrier 200, such that each of the plurality of liquid crystal cells 201 of the barrier 200 may become an opaque cell or a transparent cell, and may define a display pattern of the barrier 200 that is selected by the controller 600 based on the driving signals received from the memory. That is, the column driver and the row driver may form the display pattern of the barrier 200 by selectively applying driving voltages to the rows and the columns of the barrier 200.

The display panel driver 800 may drive the display panel 100 in response to the control signals received from the controller 600. In more detail, the display panel driver 800 may drive the display panel 100, such that the input video signals (R, G, B data) may be normally displayed on the display panel 100.

Figure 4:
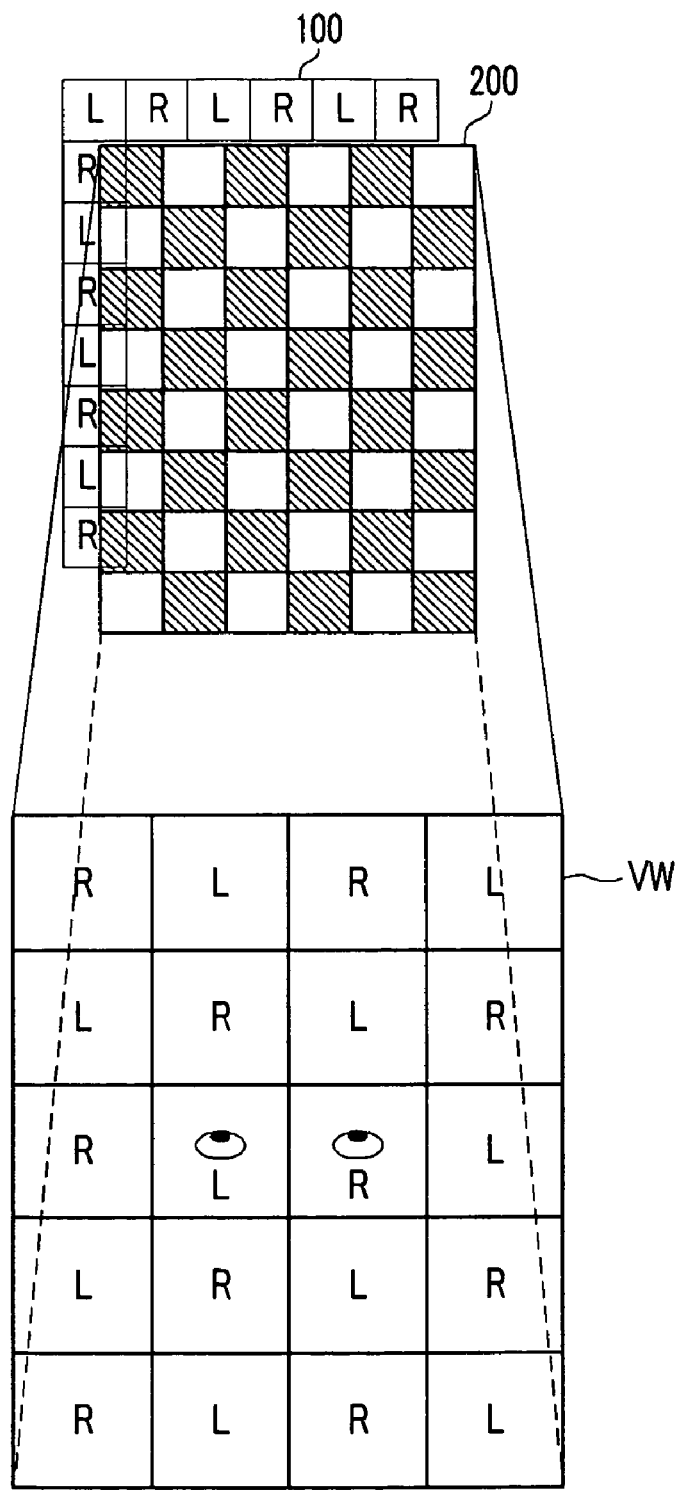
FIG. 4 illustrates a diagram of a stereoscopic image as seen by a viewer of a stereoscopic image display device according to an exemplary embodiment.

Hereinafter, how a stereoscopic image is seen via the stereoscopic image display device according to the exemplary embodiment is described with reference to FIG. 4. FIG. 4 illustrates a diagram of a stereoscopic image as seen by a viewer of the stereoscopic image display device.

For example, as illustrated in FIG. 4, each of the plurality of liquid crystal cells 201 of the barrier 200 may be selectively driven as a transparent cell (white squares in FIG. 4) or an opaque cell (dark squares in FIG. 4), so the barrier 200 may be displayed in a form of a speckled pattern, e.g., a checkered pattern. The display panel 100 may display an image that is seen by the left eye or the right eye of a viewer through the barrier 200 in the plurality of display cells 101 in response to the speckled pattern of the barrier 200. Theretofore, as illustrated in FIG. 4, at an appropriate viewing distance from the stereoscopic image display device, an image may be represented on a virtual viewing window (VW) for each of the left eye and right eye of the viewer, such that the viewer perceives a stereoscopic image.

It is noted that FIG. 4 illustrates the display pattern of the barrier 200 as a speckled pattern for better understanding and ease of description. The display pattern of the barrier 200 is not limited to the speckled pattern, and exemplary embodiments may include any suitable display pattern, e.g., a striped pattern, a stair pattern, a multi-point-in-time pattern, etc. Further, an image displayed on the display panel 100 may be displayed in various ways according to the variety of patterns.

Figure 5:
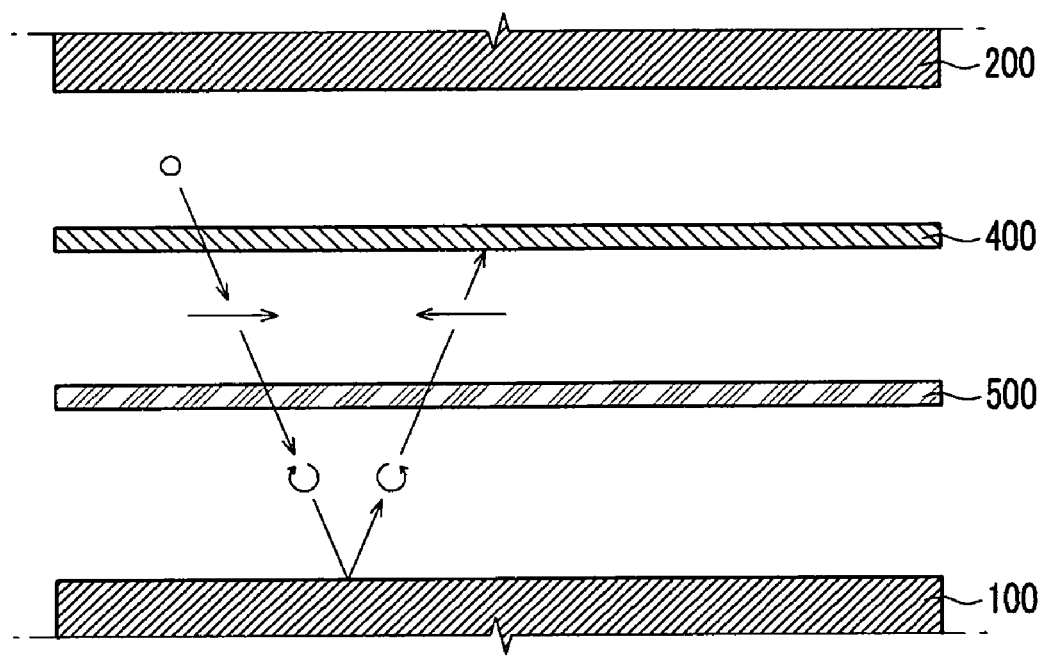
FIG. 5 illustrates a schematic diagram of a path of light in a stereoscopic image display device according to an exemplary embodiment.

In the stereoscopic image display device according to exemplary embodiments, the internal polarizing plate 400 and the phase retarder 500 placed between the barrier 200 and the display panel 100 may suppress deterioration of a stereoscopic image, as will be described below with reference to FIG. 5. FIG. 5 illustrates a schematic diagram of the path of external light in the image display device according to the exemplary embodiment.

Referring to FIG. 5, external light may be incident on the barrier 200, and may pass through the barrier 200 toward the display panel 100. It is noted that the external light is indicated by arrows in FIG. 5. It is further noted that while FIG. 5 is described with reference to external light incident on the display panel 100, embodiments are not limited thereto and may include, e.g., light emitted from the display panel 100 and then reflected from the barrier 200 to be incident on the display panel 100.

As illustrated in FIG. 5, light passing through the barrier 200 may be incident on the internal polarization plate 400, and may be linearly polarized in the direction of the polarization axis of the internal polarizing plate 400 while passing through the internal polarizing plate 400. Linearly-polarized light transmitted through the internal polarizing plate 400 is incident on the phase retarder 500, and is circularly polarized while passing through the phase retarder 500 (i.e., a ¼ wavelength plate). The optical axis of the phase retarder 500 is inclined 45° from the polarization axis of the internal polarizing plate 400, i.e., a crossing angle between the optical axis of the phase retarder 500 and the polarization axis of the internal polarizing plate 400 is 45°.

Since the crossing angle between the optical axis of the phase retarder 500 and the polarization axis of the linearly-polarized light is 45°, the linearly-polarized light changes to circularly-polarized light while passing through the phase retarder 500. In this case, the circularly-polarized light is left circularly-polarized light. However, the exemplary embodiment is not limited thereto. For example, the phase retarder 500 may be disposed such that light passing through the phase retarder 500 may be right circularly-polarized light.

Next, the left circularly-polarized light, i.e., light incident on the display panel 100, may be reflected from the electrodes of the organic light emitting element L1 within the display panel 100. It is noted that light incident on the display panel 100 may also be reflected from metal wires other than the electrodes of the organic light emitting element L1. The left circularly-polarized light reflected from elements in the display panel 100 is changed to right circularly-polarized light, i.e., a phase change of 180°, and may be directed toward the phase retarder 500. The right-circularly polarized light incident on the phase retarder 500 is changed to linearly-polarized light while passing through the phase retarder 500. As the right-circularly polarized light is at a phase change of 180° with respect to the left-circularly polarized light, the linearly-polarized light directed from the phase retarder 500 toward the internal polarizing plate 400 has a polarization axis that is opposite to the polarization axis of light directed from the internal polarizing plate 400 toward the phase retarder 500. In other words, the linearly-polarized light directed from the phase retarder 500 toward the internal polarizing plate 400 has a polarization axis that is opposite to the direction of the polarization axis of the internal polarizing plate 400, so the internal polarizing plate 400 may absorb the light emitted from the phase retarder 500 toward the internal polarizing plate 400.

Therefore, light reflected from the display panel 100 to the outside, i.e., external light passing through the barrier 200 toward the display panel 100 or light that is emitted from the display panel 100 and then reflected in the barrier 200, may be absorbed by the internal polarizing plate 400, thereby preventing or substantially minimizing light reflection from internal elements of the stereoscopic image display device toward the viewer. That is, light between the barrier 200 and the display panel 100 may be transmitted through the internal polarizing plate 400 and the phase retarder 500 to be incident on the display panel 100 at predetermined angle and polarization, so that light reflected from the display panel 100 may be transmitted through the phase retarder 500, again, to be absorbed by the internal polarizing plate 400, so that the light is not seen outside. In other words, since light having a refracted image of the barrier 200 or the display panel 100 is not seen outside, deterioration of the image quality of the stereoscopic image display device may be suppressed or substantially minimized.

As described previously, the air layer AL may be formed between the phase retarder 500 and the display panel 100, since both the phase retarder 500 and the internal polarizing plate 400 may be attached to the barrier 200. Even if the air layer AL changes the optical axis of light, since the internal polarizing plate 400 and the phase retarder 500 according to the exemplary embodiment are attached to the barrier 200, e.g., no air layers may be formed between any two of the internal polarizing plate 400, the phase retarder 500 and the barrier 200, deterioration of image quality resulting from optical axis interference of the air layer AL does not occur. In more detail, even if the optical axis of light reflected by the display panel 100 is changed by the air layer AL, the light reflected by the display panel 100 is absorbed by the internal polarizing plate 400 via the phase retarder 500 because the phase retarder 500 and the internal polarizing plate 400 are attached to each other.

According to the above-described construction, the stereoscopic image display device according to the exemplary embodiment may include an internal polarizing plate and a phase retarder sequentially attached to a barrier between the barrier and a display panel. Therefore, reflected light from the display panel may be suppressed, thereby preventing or substantially minimizing deterioration of the image quality of the stereoscopic image display device.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A stereoscopic image display device, comprising:
a display panel configured to display an image;
a barrier on the display panel, the barrier including a plurality of liquid crystal cells, and being configured to selectively drive each of the liquid crystal cells to become a transparent cell or an opaque cell;
an internal polarizing plate between the display panel and the barrier; and
a phase retarder between the internal polarizing plate and the display panel.

2. The stereoscopic image display device as claimed in claim 1, wherein the internal polarizing plate is attached to the barrier, and the phase retarder is attached to the polarizing plate.

3. The stereoscopic image display device as claimed in claim 2, further comprising an air layer between the phase retarder and the display panel.

4. The stereoscopic image display device as claimed in claim 3, wherein:
   the internal polarizing plate is configured to linearly polarize light, and
   the phase retarder is configured to circularly polarize the linearly polarized light transmitted through the internal polarizing plate.

5. The stereoscopic image display device as claimed in claim 4, wherein the phase retarder includes a ¼ wavelength plate, a crossing angle between an optical axis of the phase retarder and a polarization axis of the internal polarizing plate being 45°.

6. The stereoscopic image display device as claimed in claim 1, further comprising an external polarizing plate, the barrier being between the external polarizing plate and the internal polarizing plate.

7. The stereoscopic image display device as claimed in claim 1, wherein the internal polarizing plate and the phase retarder are stacked on the barrier.

8. The stereoscopic image display device as claimed in claim 7, wherein the phase retarder is spaced a predetermined distance from the display panel.

9. The stereoscopic image display device as claimed in claim 7, wherein the internal polarizing plate directly contacts the phase retarder and the barrier.

10. The stereoscopic image display device as claimed in claim 1, wherein the display panel includes:
    a first display substrate;
    a second display substrate opposite to the first display substrate; and
    an organic light emitting element between the first display substrate and the second display substrate and configured to display the image.

11. The stereoscopic image display device as claimed in claim 10, wherein the barrier includes:
    a first barrier substrate;
    a second barrier substrate opposite to the first barrier substrate; and
    a liquid crystal layer between the first barrier substrate and the second barrier substrate and configured to form the plurality of liquid crystal cells.

12. The stereoscopic image display device as claimed in claim 11, further comprising:
    a barrier driver driving the barrier;
    a display panel driver driving the display panel; and
    a controller controlling the barrier driver and the display panel driver.

13. The stereoscopic image display device as claimed in claim 1, wherein the internal polarizing plate and the phase retarder are sequentially stacked directly on the barrier.

14. The stereoscopic image display device as claimed in claim 13, wherein the phase retarder and the display panel are separated from each other by an air gap.

15. The stereoscopic image display device as claimed in claim 1, wherein the phase retarder is on a first surface of the display panel, a second surface of the display panel opposite the first surface contacting an exterior of the stereoscopic image display device.

* * * * *